United States Patent Office 2,755,189
Patented July 17, 1956

2,755,189

COATING PROCESS FOR FRUITS AND VEGETABLES

Carl E. Gericke, Orlando, Fla., assignor to American Machinery Corporation, Orlando, Fla., a corporation of Florida No Drawing. Application June 24, 1954,
Serial No. 439,153

12 Claims. (Cl. 99—168)

This invention relates to an improved method of applying a wax coating composition to wetted surfaces of fruits and vegetables prior to packing and shipping, and to an improved wax-coating composition for use in said method, this application being a continuation-in-part of application Serial No. 318,760 filed November 4, 1952 and now abandoned.

The invention meets the demand of the fruit and vegetable industry that these products be surface treated with a wax prior to shipment in order to control decay, retard shrinkage and to enhance the appearance thereof.

Many wax coatings have been and are now being used and many processes have been devised to apply wax and wax-like materials to the surface of fruits and vegetables at the packing plants. Some of these waxes have been in cake or paste form and applied to the produce by wipers which contact both the wax and produce, but the uses of these waxes are of limited application and have not proven to be generally satisfactory. A liquefied wax has more universal acceptance because it is applicable to a greater variety of produce and can be handled easier and such liquid waxes now used are predominantly wax emulsions. The universal disadvantage, however, of these wax emulsions has been the excessive amount of wax used and/or wasted in its application to the produce, which in certain cases has retarded ripening of the same, if packed green, as well as the accumulation of wax in the machinery, and particularly on the brushes used in applying or polishing the produce, requiring frequent interruption of operation to permit cleaning and replacement of these parts. Other types of liquefied wax coating material employ volatile solvents, the coating being atomized upon the produce, during which the solvent evaporates causing a hazardous situation.

One of the principal objects of this invention is the preparation of edible produce, such as fruits and vegetables, for market which includes the washing of the produce and, then, immediately following said washing and while the produce is still wet, applying a wax-coating to the produce of a type having spreading characteristics that cause the water on the surface of the produce to collect in large droplets on said surface which is adventitiously removed in the passage of the treated produce through the packing house, thus eliminating the necessity for the usual drier for drying the produce prior to waxing.

Another principal object of the present invention is the provision of a wax concentrate that is to be applied directly upon the produce in a fluid condition and, therefore, does not need diluents to permit its application and which is of such a character that minute quantities spread and efficaciously cover the produce without waste while giving excellent appearance and decay and shrinkage control, without hazard.

It is a further object of this invention to supply a wax concentrate that will lubricate the surface of the product, which may be applied in much smaller amounts than has heretofore been used, which will assist in removing moisture from the surface of the product by causing the moisture to collect in large droplets, and which is not sticky thus preventing the adherence of foreign matter to said coated surface.

The novel wax concentrate of this invention comprises a super-saturated solution of wax or waxes at ordinary temperatures of 75° F. to 90° F. in a graduated solvent system containing an oil soluble surfactant.

The term "super-saturated solution" as applied to the solution of waxes in a solvent of the kind disclosed in the invention refers to the physical state of the solution at ordinary temperature. The term "graduated solvent system" refers to a blended solvent. The term "oil soluble surfactant" means a surface active agent containing from 12 to 22 carbon atoms in the molecule and having a lesser amount of water solubilizing groups such as $SO_4$, —Cl, —$NH_2$, $SO_3$, so that the surfactant tends to concentrate in the oil phase rather than in the aqueous phase.

The term "wax" is used in this specification in its generic sense and applies to any solid or semi-solid material which is deposited on the outside of produce for the purpose of establishing a protective coating. If vegetable waxes are intended to be exclusively specified they will be designated by name.

The wax may be of mineral, vegetable or animal origin of either the natural or synthetic type and may be a mixture of two or more of these waxes. The wax must be amorphous in nature, that is, lacking a pronounced crystalline structure in the solid state. The proportions of the waxes making up the wax blend are predicated upon the degree of gloss, amount of lubrication, and shrinkage prevention desired in the final coating. This, of course, varies from product to product according to the nature of the product itself. For example, a different wax is required for tomatoes from that required for citrus fruit, while cucumbers require still another blend of wax. The total concentration of the waxes is approximately the maximum amount which is completely dissolved in the solution at 90° F. to 120° F., and which may amount to approximately 7% and 20% of the total solution. Paraffin is the preferred wax because of its high solubility in petroleum hydrocarbon solvents. To increase the lubricating qualities as in tomato wax, petrolatum is added to the paraffin to make a softer wax. High melting point waxes, such as carnauba and sugar cane wax, are preferably blended with the paraffin to increase the gloss. It has also been found that certain synthetic resins such as "Piccolytes" (terpine derived resin) and "Piccolastics" (styrene resins), are also effective in hardening the paraffin in this wax concentrate. Other waxes and resins which are mutually compatible may also be used.

The graduated solvent system is selected to give the optimum effect. It must have a high degree of solvency for all the ingredients that are to be held in homogeneous solution at the time of application. Since the temperature of application is 90° F. to 120° F., it is immaterial that the wax stay in solution at a temperature substantially below this temperature of application. It is only necessary that all the components of this solution be homogeneous at the time of application. The wax is preferably applied at a very low rate and the solvent system should therefore be of a non-volatile type to prevent the evaporation during application. The solvent must also be neither toxic nor damaging to the product. All of the solvents are of a non-aqueous type and essentially immiscible with water.

Three general types of solvents are utilized in the preferred system:

(1) Mineral oil having a very low rate of evaporation and of high lubrication properties, commonly known as heavy grade having a commercial designation of Saybolt viscosity of 335 to 345 minutes. It also acts as a plasticizer for the waxes used.

(2) Aromatic hydrocarbon type solvents such as #106 Heavy Solvent, which is a mixture predominantly xylol with a small amount of accompanying cresols, and which is added in sufficient quantity to increase the solvency of the system and decrease the viscosity of the mineral oil and the wax concentrate.

(3) Terpineol #214, a tertiary alcohol derived from a steam distilled pineoil, or the equivalent is added to balance the odor of the aromatic solvents and to increase the solvency of the system for the waxes. However, aliphatic solvents may be also employed for purposes of dilution.

In order to aid the spreading qualities of this concentrate a small amount of a surfactant, that is, an agent having an affinity for the surface of the product, is added. This allows the waxing of wet products taken directly from the washing step in the packing process and causes the water to collect in large droplets and be more readily removed from the surface in its passage through the packing house. The type of surface active agent found most satisfactory is that which gives water-in-oil emulsions. However, in very low concentrations, the reverse type of surface active agent giving oil-in-water emulsions has been found to be somewhat effective.

The most effective surfactants were found to be those in which the hydrophobic portion of the molecule had a greater oil solubility than the hydrophillic portion of the molecule had water solubility so that the surfactant tended to be more soluble in an oil phase than in a water phase. These are called water-in-oil emulsifiers. The alkaline-earth (calcium, magnesium etc.) soaps, metallic (aluminum, iron, etc.) soaps, high molecular ($C_{18}$ to $C_{33}$ chain length) aliphatic or cyclic carbon chain, oil-soluble compounds with a hydrophillic group or groupings (such as $SO_4$, $SO_3$, —Cl, —OH, —$NH_2$). It is to be noted that these emulsifiers are different in character than the more commonly known and used oil-in-water type emulsifiers such as alkaline (sodium, potassium, ammonia and volatile amines) soaps, alkyl and aryl sulfonates and many other similar products.

One of the most important features of this surface active agent is that whereby the surface tension of the concentrate may be controlled, since it is through the surface tension that the material is fed by capillary action thereby making it rise from the rotating transfer drum into the narrow slots of the overlying drip fingers of the applying apparatus. It has been found that the surface tension in dynes per centimeter should be in the neighborhood of 32 to 34 at 110° F. It is also necessary for the viscosity of the thicker wax concentrate to decrease with increase in temperature, and this is somewhat dependent on the type of surfactant used as set forth in the following table:

TABLE I
*Effect of temperature on viscosity of wax concentration*

| Sample No. | Basic Formula [1] Plus Surfactant | Character of Surfactant | Viscosity in Saybolt Units of Viscosity in Seconds at— | | |
|---|---|---|---|---|---|
| | | | 100° F. | 110° F. | 120° F. |
| 1 | Ethomid HT/15 | w/o Polyoxyethylene (5 mols) substituted tallow fatty acid. | 128.4 | 98.5 | 82.5 |
| 2 | Ethomid HT/25 | o/w Polyoxyethylene (15 mols) substituted tallow fatty acid amides. | 128.0 | 98.5 | 82.5 |
| 3 | Ethofat 242/25 | o/w Polyoxyethylene (15 mols) substituted resin fatty acids. | 122.0 | 98.5 | 82.5 |
| 4 | Citrosol D | o/w Sulfonated petroleum product. | 130.5 | 100.0 | 82.5 |
| 5 | Arquad 2C | w/o Dialkyl quarternary ammonium salts of coconut oil fatty acids. | 131.0 | 100.0 | 82.5 |
| 6 | Ethomeen S/15 | w/o Tertiary amines of soybean fatty acids containing one alkyl group and two polyoxyethylene groups (5 mols). | 130.0 | 98.5 | 82.7 |
| 7 | Ethomeen S/25 | o/w Tertiary amines of soybean fatty acids containing one alkyl group and two polyoxyethylene groups (15 mols). | 125.0 | 98.0 | 81 |
| 8 | Span 80 | w/o Sorbitan mono-oleate | 122.0 | 100.5 | 82.8 |
| 9 | Tween 40 | o/w Sorbitan monopalmitate | 127.5 | 99.0 | 81.8 |
| 10 | Al. Stearate S | w/o Aluminum distearate | 153.0 | 114.5 | 88.7 |
| 11 | Control | | 126.0 | 96.5 | 81.9 |
| 12 | Amine 220 | w/o 1-hydroxyethyl-2-heptadecenyl gloyoxalidine. | | | |

[1] As given in Example 1.

It has been found that the wax concentrate described herein, using tomato wax Formula No. 1 (hereinafter referred to as Example one), in a drip finger machine delivers a weight of wax in 10 minutes varying from .8 to 1.7 grams at 120° F., depending upon the width of the slot in the fingers.

It has also been found that five pounds of this concentrate will wax about 400 boxes of fruit, which would have required about 5 gallons of the old type emulsion.

Examples of preferred wax and solvent mixtures, or concentrates found suitable for the purposes of invention are as follows:

EXAMPLE 1

A composition used for wax treating tomatoes:

| | Percent |
|---|---|
| Petroleum | 5.75 |
| Paraffin | 7.20 |
| Terpineol | 7.20 |
| Coal-tar solvent | 7.20 |
| Mineral oil | 71.55 |
| Surfactant | 1.10 |

EXAMPLE 2

A composition used for treating cucumbers:

| | Percent |
|---|---|
| Paraffin | 7.60 |
| Terpineol | 7.60 |
| Coal-tar solvent | 7.60 |
| Mineral oil | 76.00 |
| Surfactant | 1.20 |

EXAMPLE 3

A composition used for treating citrus fruit, such as oranges:

| | Percent |
|---|---|
| Carnauba wax | 4.50 |
| Paraffin | 9.00 |
| Coal-tar solvent | 42.50 |
| Naphtha solvent | 42.50 |
| Surfactant | 1.5 |

The novel wax concentrate with the advantages herein described comprises 7% to 20% wax, 80% to 92% solvent and 1% to 1.5% surfactant. An optimum concentration of total wax has been found to be in a range of 10% to 14%. The advantages of this type of wax concentrate over the forms now in common use are many, among which the principal being the ease of application by means of the drip finger applicator, the ability to control the quality so applied, the freedom of the machinery from accumulation of surplus wax, and the ability to apply the wax to the wet fruit or vegetables.

The last of the advantages, just mentioned, permits previous methods or processes, employed in the application of wax coatings to edible produce, to be modified by eliminating the necessity for a drying step in the packing process between the washing and the waxing steps, thus saving time and possible damage or injury to the produce, due to the added handling or conveyance of the product through the drying step, as well as the initial cost of and maintenance of the drying machinery. Therefore, the present invention embraces the improved method of preparing edible produce of the market by washing the produce and, then, immediately applying a wax coating to the produce, while wet, of the character that causes the moisture on said produce to collect in large droplets that are adventitiously removed during the passage of the coated produce through said treating method. Thus, the water present on the fruit or vegetable, after washing, does not have to be removed prior to treatment with the solution made in accordance with this invention. The reason for this is, that the oil is the continuous phase and the water present on the fruit, after washing, coalesces into drops when the fruit is treated with this material, which drops are removed by the applicator brushes, rollers, conveyors or the like usually employed in the treating apparatus.

When it is desired to add a coloring material to the wax so that the final product has a color impressed thereon, it has been found desirable to incorporate therein a dye material of either the oil or water soluble type. Examples of the oil soluble type are FDC Red 32 for use on sweet potatoes and oranges; FDC Orange 2, also for use on sweet potatoes and oranges; or a vegetable dye of the carotene type. These may be added in an amount of from 1–10% of the total composition.

EXAMPLE 4

A composition for treating potatoes containing a water soluble type dye:

|  | Percent |
|---|---|
| Paraffin | 4.29 |
| Piccolyte S/125 | 2.40 |
| Terpineol #214 | 4.29 |
| #106 H. S. | 4.29 |
| Mineral spirits | 8.00 |
| Mineral oil | 46.44 |
| Ethomid HT/15 | .69 |
| Amine 220 | 4.80 |
| F. D. C. Red #1 dye | 4.80 |
| Water | 20.00 |

In the above example the dye is of the water soluble type. This example also contains amine 220, which is a water-in-oil type surfactant and is present in an amount totaling 6–7% of the composition. The amount of water present, that is necessary to carry the dye and increase its color imparting powers, may range from 15% to 25% of the total composition. This differs radically from the so-called "water-wax" composition containing from 80 to 96% water at the time of use. Other dyes, which may be used in the composition set forth in Example 4, are FDC Red #2 in place of the FDC Red #1 dye. This dye may be used in coloring Irish potatoes and sweet potatoes.

EXAMPLE 5

|  | Percent |
|---|---|
| Wax | 7 to 20 |
| An oil soluble surfactant | 1 to 1.5 |
| Dye | 5 |

The balance being a non-aqueous solvent.

EXAMPLE 6

|  | Percent |
|---|---|
| Wax | 11 |
| Solvent | 58 |
| Surfactant | 5 |
| Dye | 5 |

The balance being water.

EXAMPLE 7

|  | Percent |
|---|---|
| Wax | 10 |
| Solvent | 12 |
| Water | 15 to 25 |
| An oil soluble surfactant | 6 to 7 |
| Dye, about | 5 |

The balance being a mineral oil.

In the above examples as much as 12% or 13% wax can be used as well as 86% non-aqueous solvent.

It is the usual practice in making wax emulsions, that water soluble materials are invariably used, such as soap and similar materials to effect the emulsification of the wax. The higher the proportions of water soluble materials in the surface coating the poorer is the resistance to the passage of water vapor and therefore the poorer the shrinkage control on the fruit and vegetables to which the surface coating is applied. The wax concentrate described herein does not require the usual water soluble material as the surfactants used are only those with poor solubility in water. This therefore produces a wax coating giving excellent shrinkage control.

Since this wax concentrate does not contain water soluble materials such as alkali soaps, a coating of the wax of this invention will not become sticky or gummy when brought into contact with moisture, as do water wax coatings. This condition arises when condensation forms on produce which comes out of refrigeration or into a warmer atmosphere.

The use of this wax concentrate gives an essentially uniform coating, whereas the effective use of water-wax for coating purposes is quite variable—depending on different quality of produce treated and upon the differences in composition of water used to dilute water-waxes and various other factors—so that a commercial user must exercise a considerable degree of skill and judgment in order to secure a satisfactory coating.

The materials, employed in making this wax concentrate, have such low surface tension that spreading is not a problem as it is in the case of wax emulsions which are of an aqueous nature. Therefore, a low concentration of surfactant is required for this wax concentrate. Because of the high surface tension of water, a high proportion of surfactants is necessary in wax emulsions in order to properly wet the surface of the fruit and vegetables on which they are applied. The concentrate disclosed contains little or no water and therefore this is not a problem in using these concentrates.

Since these waxes are non-aqueous or have a low water content the deleterious effect of water on the machinery and brushes in particular is avoided and the life of the brushes is thereby extended. Brushes (from 12–20 in an applicator) using water-wax will not last more than one season.

The reduction in volume of wax to be applied when compared to the water-waxes is noteworthy. The wax concentrate is distributed in five gallon containers as compared to the fifty-five gallon containers in which water-wax is distributed.

The use of this wax concentrate gives produce a translucent appearance so that the natural color and appearance is emphasized. Water-wax coatings tend to leave the surface opaque even though some of the better water-wax coatings are glossy when first applied.

Reduction of 25% to 75% in cost have been effected through use of this wax concentrate over other existing types of coatings.

Also, the use of this wax concentrate eliminates the need of dryers for drying the produce immediately after washing and soaking and prior to waxing, or, if preferred, permits the use of a dryer of considerably reduced size than previously required. In the present practice, dryers are costly and take up a large amount of floor space as well as needing a considerable supply of heat. It has been found that polishers of a reduced size and cost may be employed with the composition disclosed in this invention.

The invention is not restricted to the mode of application described as obviously other means and methods of applying the wax concentrate to various products may be utilized.

What is claimed is:

1. A process for treating fresh fruit and vegetables preparatory to shipment, comprising the steps of washing said produce; and applying to said produce while still wet a wax composition—containing 7% to 20% wax, 1% to 1.5% of an oil soluble surfactant, the balance being a non-aqueous solvent—that facilitates the removal of water and foreign matter from the surface of said produce.

2. A process for treating fresh fruit and vegetables preparatory to shipping, comprising the steps of washing said produce and applying thereto while still wet a wax composition comprising a non-aqueous solvent mixture containing 7% to 20% of wax so as to super-saturate the solvent at normal temperatures and with an optimum wax concentration of 10% to 14%; and 1% to 1.5% of an oil soluble surfactant to promote spreading of the wax in a thin film upon the wet surface of the treated produce to the exclusion of moisture.

3. A process as claimed in claim 2 wherein about 5% of a dye is added to the wax mixture.

4. A process for treating tomatoes preparatory to shipment comprising the steps of washing said tomatoes and applying thereto while the produce is still wet a wax composition comprising approximately 13% wax, 86% hydrocarbon solvent and 1% an oil soluble surfactant.

5. A process for treating potatoes comprising the steps of washing said potatoes and applying to them while still wet a wax composition containing 11% wax, 58% non-aqueous solvent, 5% surfactant, said surfactant being of the type that will give a water in oil emulsion, 5% dye and the balance being water.

6. A process for treating fresh fruits and vegetables preparatory to shipment, which comprises the steps of treating said fruits and vegetables with a non-aqueous solvent mixture containing 7% to 20% of wax such as to super-saturate the solvent at normal atmospheric temperatures, and 1% to 1.5% of an oil soluble surfactant promoting spreading of the wax in a thin film upon the surface of the treated product to the exclusion of moisture.

7. A process for treating fresh fruits and vegetables preparatory to shipment which comprises the steps of treating said fruits and vegetables with a non-aqueous solvent mixture containing 7% to 20% of wax such as to super-saturate the solvent at normal temperatures and with an optimum wax concentration of 10% to 14%, and 1% to 1.5% of an oil soluble surfactant for promoting spreading of the wax in a thin film upon the surface of the treated products to the exclusion of moisture.

8. A process for coating fresh fruits and vegetables to retard decay and minimize shrinkage, which comprises the steps of treating with a composition, containing 7% to 20% wax, 1% to 1.5% of an oil soluble surfactant, the balance being solvent.

9. A process as set forth in claim 8, wherein the wax is selected from the group consisting of petrolatum, paraffin and Carnauba wax, and a hardener selected from the group consisting of terpene derived resins and styrene derived resins.

10. A process as set forth in claim 8, wherein the solvent comprises at least one substance selected from the group consisting of coal tar solvent, mineral oil, terpinol and naphtha solvent.

11. A process for treating vegetables and fruits, which comprises the steps of treating the same with a composition containing about 12% wax selected from the group consisting of petrolatum and paraffin, 86% of a non-aqueous solvent consisting of terpineol and coal tar solvent, a mineral oil and about 1% of an oil soluble surfactant.

12. A process for treating vegetables and fruits, which comprises the steps of contacting the same with a composition containing about 10% wax, about 12% non-aqueous solvent, 15% to 25% water, 6 to 7% of an oil soluble surfactant, about 5% dye and a mineral oil.

References Cited in the file of this patent

UNITED STATES PATENTS

| | | |
|---|---|---|
| 890,504 | Dosselman et al. | June 9, 1908 |
| 1,472,239 | Buell | Oct. 30, 1923 |
| 1,585,371 | Brogden | May 18, 1926 |
| 2,150,283 | Mac Rill | Mar. 14, 1939 |
| 2,425,073 | Sharma | Aug. 5, 1947 |
| 2,432,406 | Gerwe et al. | Dec. 9, 1947 |
| 2,456,283 | Jefferson | Dec. 14, 1948 |
| 2,510,816 | Greenstreet | June 6, 1950 |
| 2,561,816 | Pabst et al. | July 24, 1951 |